O. M. SCHMID AND L. S. HOPKINS.
E. SCHMID, EXECUTRIX OF O. M. SCHMID, DEC'D.
PHONOGRAPH FRICTION DRIVE MECHANISM.
APPLICATION FILED OCT. 26, 1918.
1,365,732.
Patented Jan. 18, 1921.
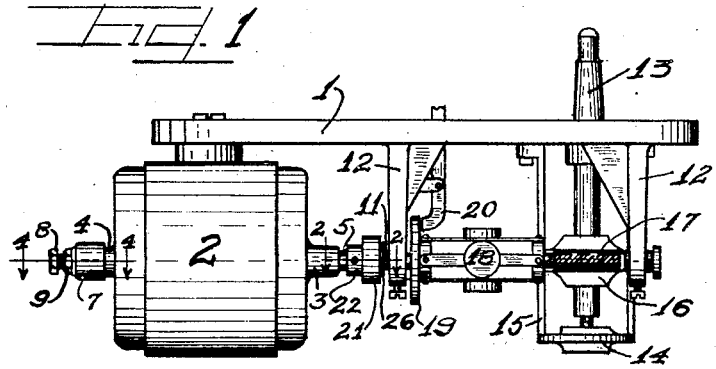
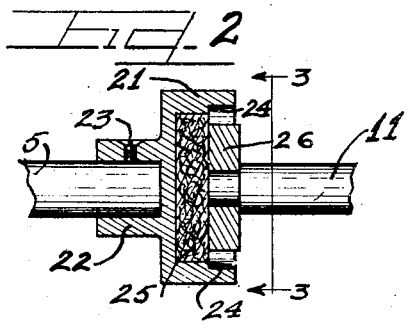
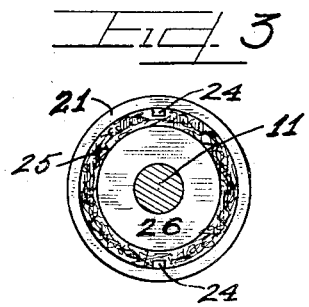
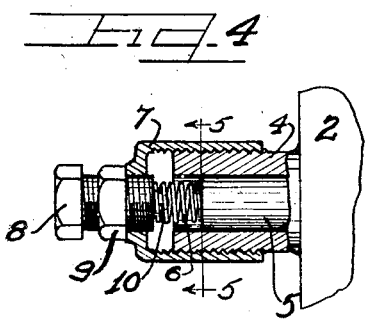
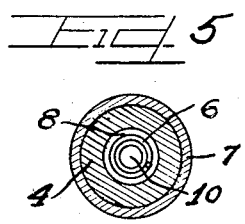
Witnesses
Rudolph J. Berg
Inventors
OTTO M. SCHMID.
LUTHER S HOPKINS
By Charles W. Hill Atty.

UNITED STATES PATENT OFFICE.

OTTO M. SCHMID AND LUTHER S. HOPKINS, OF DUBUQUE, IOWA; EMMA SCHMID EXECUTRIX OF SAID OTTO M. SCHMID, DECEASED.

PHONOGRAPH FRICTION DRIVE MECHANISM.

1,365,732.   Specification of Letters Patent.   Patented Jan. 18, 1921.

Application filed October 26, 1918. Serial No. 259,869.

*To all whom it may concern:*

Be it known that we, OTTO M. SCHMID and LUTHER S. HOPKINS, citizens of the United States, and residents of the city of Dubuque, in the county of Dubuque and State of Iowa, have invented certain new and useful Improvements in Phonograph Friction Drive Mechanism; and we do hereby declare that the following is a full, clear, and exact description of the same, reference being had to the accompanying drawings, and to the numerals of reference marked thereon, which form a part of this specification.

This invention relates to an improved form of a phonograph adjustable friction drive mechanism adapted to drive the record carrying means at a constant predetermined speed.

It is an object of this invention to construct an adjustable friction drive mechanism for phonographs.

Another object of this invention is the construction of a friction drive mechanism wherein a driving mechanism is adapted to be moved toward or away from a driven mechanism to increase or decrease the speed of rotation of the driven mechanism.

It is also an object of this invention to provide a driving mechanism wherein a spring controlled felt driving member is adapted to permit a predetermined speed to be transmitted to a driven mechanism.

A further object of the invention is the construction of a phonograph driving mechanism having an oil soaked felt driving member adapted to transmit a predetermined drive to a driven member frictionally engaged therewith.

It is furthermore an object of this invention to provide an adjustable friction driving mechanism associated with the ends of an axle of a driving member, whereby said axle is adapted to be adjustably moved to permit said mechanism to frictionally drive a driven mechanism at a constant predetermined speed depending upon the adjustment of the driving mechanism.

It is also an object of the invention to provide a phonograph friction driving mechanism mounted on a shiftable spring controlled motor shaft which is adapted to be adjustably moved with said mechanism to frictionally drive a driven mechanism at a predetermined constant speed.

It is an important object of this invention to construct a phonograph friction drive mechanism of simple and effective form adapted to transmit a constant drive to a driven member by means of a felt driving member.

Other and further important objects of this invention will be apparent from the disclosures in the specification and drawings.

The invention (in a preferred form) is illustrated in the drawings and hereinafter more fully described.

In the drawings:

Figure 1 is an elevational view of a phonograph operating mechanism equipped with an adjustable friction driving mechanism embodying the principles of this invention.

Fig. 2 is an enlarged fragmentary detail section taken on line 2—2, of Fig. 1, with parts shown in elevation illustrating the friction coupling of the driving mechanism.

Fig. 3 is a sectional view taken on the line 3—3, of Fig. 2.

Fig. 4 is an enlarged fragmentary detail section taken on line 4—4, of Fig. 1, showing parts in elevation and illustrating the controlling portion of the driving mechanism.

Fig. 5 is a section taken on line 5—5, of Fig. 4.

As shown on the drawings:

The reference numeral 1, indicates a frame plate, having attached to the under surface thereof an electric motor 2, which has integrally formed centrally on the inner end of the casing thereof a centrally passaged hub or sleeve 3. Integrally formed centrally on the outer end of the motor casing is an externally threaded hub or sleeve 4, which is axially alined with the hub 3, to afford suitable bearings for the motor shaft or axle 5, the inner end of which projects through and beyond the hub 3, while its outer end extends to within a short distance of the outer end of the hub 4, to permit one end of a controlling spring 6, to seat against the outer end of said shaft within the hub 4.

Removably threaded upon the hub 4, is an internally threaded cap 7, the outer end of which is provided with a threaded opening to removably receive an adjusting screw bolt 8, having mounted thereon a locking nut 9. Integrally formed on the inner end of the screw bolt 8, is a knob or projection 10, adapted to project into the outer end of the controlling spring 6, which bears against the inner end of the screw bolt 5. It will thus be seen that the spring 6, is held in a compressed position acting to force the motor shaft longitudinally through the motor.

A driven shaft 11, is axially alined with the motor shaft 5, and is journaled in depending bearing brackets 12, the upper ends of which are integrally formed or rigidly secured to the under surface of the frame plate 1. Journaled vertically through the frame plate 1, is a record rotating shaft 13, the lower end of which is seated in a suitable bearing 14, which is mounted in a bracket extension 15, extending downwardly from beneath and rigidly secured to the frame plate. Secured on the shaft 13, is a worm wheel 16, which is in mesh with a worm 17, formed on the driven shaft 11. Mounted on the driven shaft 11, is a centrifugal ball governor denoted as a whole by the reference numeral 18, and a friction disk 19, forms a part of said governor. Said friction disk 19, is adapted to be drawn outwardly on the shaft 11, against a pivoted brake lever 20, when the governor weights are caused to fly outwardly due to the rotation of the driven shaft 11.

The motor 2, serves to drive the shaft 11, through a friction coupling or friction drive mechanism comprising an open casing, cup or shell 21, having integrally formed centrally on the back thereof a recessed collar or hub 22, which fits over and is rigidly secured on the inner extending end of the motor shaft 5, by means of a screw 23, or other suitable means. Integrally formed within the shell 21, are a plurality of keys or projections 24, which are adapted to engage in grooves or notches formed in the peripheral surface of a friction driving member or plate 25, to hold the same secured within the shell to be rotated thereby. The friction driving member 25, is preferably made of felt which is saturated or soaked with oil to keep the felt from packing and give a cushioning effect thereto. The friction driving member may however be made of other suitable material if desired. A disk or plate 26, is rigidly secured on the inner end of the shaft 11, and projects into the shell 21, to engage the felt friction driving member 25.

The operation is as follows:

When the phonograph motor 2, is set in operation, the shaft 5, thereof acts to rotate the friction coupling shell 21, and the felt driving member 25, therewith at the speed imparted by the motor. Rotation of the felt driving member 25, which frictionally engages the coupling disk 26, acts to drive said disk and thereby the shaft 11, to cause rotation of the record rotating shaft 13, through the worm 17 and worm wheel 16, at a constant predetermined rate of speed, which is controlled or determined by the spring 6, which bears against the motor shaft and acts to shift or move the motor shaft longitudinally through the motor casing thereby forcing the felt driving member into frictional engagement with the coupling disk 26. The drive to be transmitted by the felt driving member depends upon the compression of the spring 6, which compression is determined by the adjusting screw bolt 8, which may be set and locked in a desired or predetermined adjusted position by the lock nut 9. For a certain compression of the controlling spring 6, the felt driving member 25, is frictionally pressed against the driven disk 26, to cause rotation of said disk at a constant speed, irrespective of any variations in the speed of the driving motor, which variations are of course compensated for by slippage between the driving and driven members of the friction drive mechanism. It will thus be seen that the phonograph shaft 11, and the record rotating shaft 13, are rotated at a constant predetermined rate of speed, which constant speed may be adjusted if desired in the customary way by adjusting or setting the brake lever 20 to control the operation of the governor 18.

By means of the screw bolt 8, and the spring 6, the record rotating shaft 13, may be rotated at a plurality of different constant speeds, each one of which, if desired, may be controlled by using the governor and brake lever mechanisms, which mechanisms, of course, may be entirely omitted if preferred and all speed adjustments made directly by means of the controlling screw bolt 8 and the spring 6.

The friction driving member 25, is preferably made of felt, saturated with oil, to keep the felt from packing and acting further to give or maintain a cushioning effect in said driving member. It will be understood that other suitable materials may be used in the construction of the friction driving member, and that the friction regulating or controlling mechanism may be varied and still produce the desired results in the operation of the friction drive or coupling mechanism.

We are aware that many other details of construction may be varied through a wide range without departing from the principles of this invention, and we therefore do not purpose limiting the patent granted otherwise than necessitated by the prior art.

We claim as our invention:

1. A phonograph friction drive mechanism, comprising an electric motor having its shaft axially shiftable, a driven shaft in alinement therewith, a cup fixed to one of said shafts, a friction plate fixed in said cup, a disk or plate fixed to the other shaft and disposed to engage frictionally said friction plate, spring means acting on the opposite end of the motor shaft to maintain a predetermined frictional pressure between said surfaces, and means capable of being operated while the parts are in motion for adjusting the tension of said spring.

2. A phonograph friction drive mechanism, comprising an electric motor having its shaft axially shiftable, a driven shaft in alinement therewith, friction surfaces on said shafts adapted to have their degree of contact with each other varied by the axial movement of said motor shaft, an externally threaded hub surrounding the outer end of the motor shaft and projecting beyond the same, an internally threaded cap engaging said hub, an adjusting screw located in said cap in axial alinement with said motor shaft, and a coiled spring disposed between said screw and the outer end of said motor shaft and seated within said hub, the whole operating to maintain said spring in position and to permit an adjustment of the tension of said spring upon said motor shaft to vary the degree of contact of said friction surfaces.

In testimony whereof we have hereunto subscribed our names in the presence of two subscribing witnesses.

OTTO M. SCHMID.
LUTHER S. HOPKINS.

Witnesses:
  Aug. J. Stolteben,
  Geo. W. Slaght.